TIME-BASE CIRCUIT WITH SELF-STARTING MEANS

Filed Oct. 5, 1962 2 Sheets-Sheet 1

INVENTOR
KENNETH E. MARTIN
TEUNIS POORTER
BY
Frank R. Trifari
AGENT

INVENTOR
KENNETH E. MARTIN
TEUNIS POORTER
BY Frank R. Trifari
AGENT 3,235,766

TIME-BASE CIRCUIT WITH SELF-STARTING MEANS

Kenneth Edward Martin, Horley, England, and Teunis Poorter, Emmasingel, Eindhoven, Netherlands, assignors to North American Philips Company, Inc., New York, N.Y., a corporation of Delaware Filed Oct. 5, 1962, Ser. No. 228,677
Claims priority, application Great Britain, Oct. 26, 1961, 38,368/61
11 Claims. (Cl. 315—27)

This invention relates to time-base circuit arrangements of the kind employing a semi-conductor switching device wherein a sawtooth current is generated in a cathode-ray tube deflection coil during the non-conductive state of said switching device and wherein energy is fed back to the supply source during the said non-conductive state.

Time bases of the kind set forth have been described in U.S. Patent 2,995,679 and it is an object of the invention to obtain from such a time-base a D.C. voltage supply suitable for operating one or more semi-conductor devices in an apparatus which includes the time-base.

The apparatus may, for example, be a television receiver, a cathode ray oscilloscope or the like wherein some or all of the active elements are semi-conductor devices. The semi-conductor devices may be used in amplifiers, frequency changers, scanning generators and the like, and the D.C. supply voltage obtained from the time base may lie between 1.0 and 16.0 volts.

D.C. voltages between 1.0 and 16.0 volts cannot be obtained directly from the A.C. supply lines without the use of a step-down transformer. In the case of apparatus employing a cathode-ray tube, the use of a mains operated transformer is preferably to be avoided since the stray field therefrom may adversely affect the operation of the cathode-ray tube. It is possible to construct transformers which do not produce a stray field, but they are costly and add to the overall cost in a disproportionate manner.

According to the invention, a circuit arrangement for producing a D.C. supply voltage for apparatus including semi-conductor devices comprises, in combination, a time-base circuit of the kind set forth, means for rendering said time-base self-running and means for rectifying and filtering a fraction of the voltage generated across the transformer of the time-base during the forward stroke thereof.

Figures 1, 1A, 1B, 2, 3:
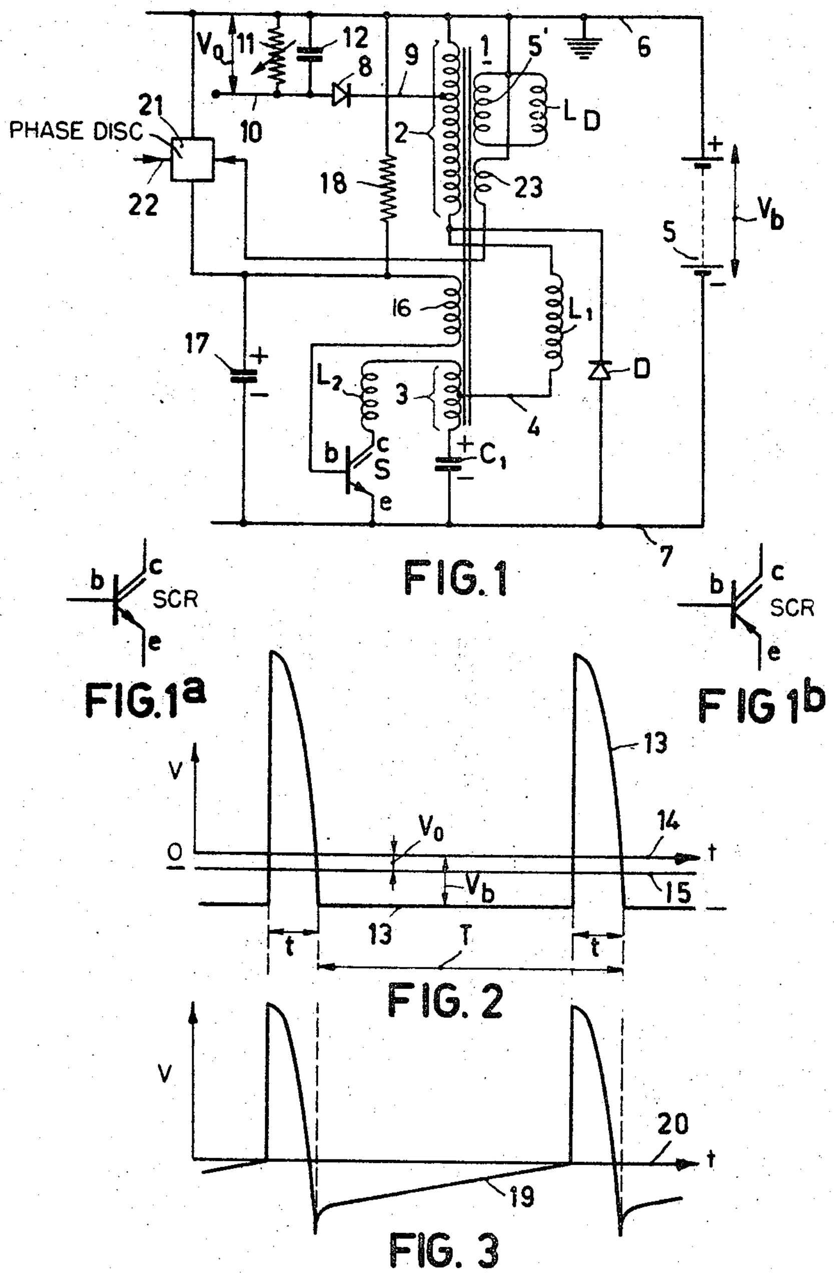
Figure 4:
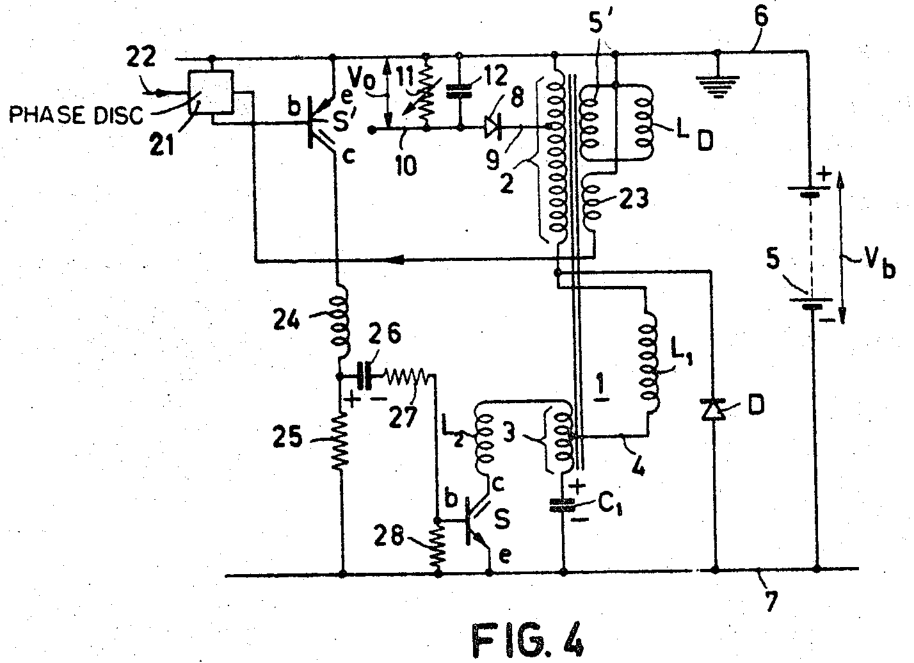

Embodiments of the circuit arrangements in accordance with the invention will now be described by way of example with reference to the accompanying drawings in which:

FIGURE 1 shows a first embodiment of the invention,

FIGURE 1*a* shows the symbol of an n-p-n-p silicon controlled rectifier used as a circuit element in the circuits of FIGURE 1 and FIGURE 4, FIGURE 1*b* shows the symbol of a p-n-p-n silicon controlled rectifier used in the circuit of FIGURE 4. The terminology describing the type of semi-conductor is derived from the sequence from the emitter to the collector.

FIGURES 2 and 3 show curves of voltage as a function of time for assisting in the description of the circuit arrangement shown in FIGURE 1 and FIGURE 4 shows a second embodiment of the invention.

The circuit arrangement of FIGURE 1 functions primarily as a deflection circuit the operation of which is described in a co-pending U.S. Patent application Ser. No. 209,982, filed July 16, 1962. This deflection circuit comprises a transformer 1, having a winding 2, a winding 3 including a tapping 4, and a winding 5', to which a deflection coil $L_D$ is connected. The coil $L_D$ may be disposed about the neck of a television display tube in a television receiver or the neck of a camera tube in a television camera for the horizontal deflection of the electron beam in said tubes. Alternatively, the coil $L_D$ may be disposed about the neck of a cathode-ray tube in a cathode-ray oscillograph employing magnetic deflection.

One end of winding 2 is connected to the positive terminal of a direct voltage source 5, supplying a voltage $V_b$, the negative terminal of which is connected through a capacitor $C_1$ to one end of winding 3. Between the other end of winding 2 and tapping 4, a charging inductance $L_1$ is provided for charging the capacitor $C_1$. The other end of winding 3 is connected through a quenching coil $L_2$ to the collector *c* of a semi-conductor switching element S, the emitter of which is connected to the negative terminal of the source 5. A diode D is also connected between the junction of winding 2 and charging inductance $L_1$ and the negative terminal of the supply source 5. The operation of the part of the deflection circuit so far described is explained in the aforesaid U.S. Patent application Ser. No. 209,982, and is not essential to the present invention. It is only important that the switching element S be conductive substantially during the flyback time *t* and the diode D conductive substantially during the forward sweep T-*t* of the current produced in the deflection coil $L_D$. One important difference between the subject invention and said U.S. Patent application is that the deflection circuit of this application is free-running, whereas in the deflection circuit of the co-pending U.S. application the conduction of the switching element is controlled by a signal voltage applied to its control electrode. As described in detail in said co-pending U.S. Patent application, in operation, semi-conductor switching element S is cut-off during the forward sweep of the sawtooth current. At that time, capacitor $C_1$ is charged from voltage source 5 by means of the circuit comprising windings 2 and 3 of transformer 1 and inductance $L_1$. During the sweep period diode D appears essentially as a short circuit so that the magnetic energy stored in the winding field is then returned to the D.C. voltage source 5. The flyback period is initiated by causing switching element S to conduct thereby providing a discharge path for the energy accumlated in capacitor $C_1$ during the sweep period. The discharge path comprises winding 3, coil $L_2$ and switching element S. During the flyblack period, diode D appears as an open circuit, or at least a very high impedance. The deflection circuit shown has the particular advantage that with correct proportioning of the number of turns of windings 2 and 3, and with a suitable selection of the tapping point 4, substantially no premagnetization will occur in the core material of the transformer 1. This feature is important if a supply voltage $V_0$ for the transistors used in the apparatus is to obtained from the transformer 1, as will be described more fully hereinafter. It is important to minimize the said premagnetization since the energy required for said transistors, which energy can be considered as a loss in the deflection circuit, does not involve the requirement of an unnecessarily large sectional area for the core of transformer 1.

Alternatively, if there are no objections to the use of a larger core, deflection circuits may be employed for the arrangement in accordance with the invention as described in a co-pending U.S. Patent application Ser. No. 215,093, filed August 6, 1962, in which some premagnetization of the core material occurs.

In order to produce efficiently a supply voltage $V_0$ for the transistors used in the apparatus which includes the said deflection circuit, the circuit element S may be a silicon controlled rectifier, hereinafter referred to as an SCR.

SCR's may be constructed so that they can withstand a high voltage in the non-conductive state without breaking down. This is due to the construction which comprises four semi-conducting layers. In the arrangement shown in FIGURE 1, for example, an n-p-n-p-SCR is used wherein the first layer, constituting the emitter *e*, is made of n-type material. The second layer, constituting the base *b* is made of p-type material. The fourth layer, constituting the collector part *c*, is also made of p-type material, whereas the third layer, arranged between the base layer, and the collector layer is made of n-type material. Such an SCR conveys a current flowing from the collector to the emitter and the symbol thereof is indicated in FIGURE 1*a*. The thickness of the third layer may be freely chosen within given limits. In accordance with the use to be made of the SCR's, it is therefore possible to construct them to cover a wide range of breakdown voltages. In the arrangement shown in FIGURE 1, the SCR (S) must be capable of withstanding a voltage of 600 to 700 v. without the risk of breakdown when the supply voltage $V_b$ is of the order of 200 v.

Supply voltages of 100 to 200 v. may be derived directly from the line voltages supplied by an electric utility, or the like. For D.C. supply lines, the supply wires 6 and 7 may be connected directly thereto. For A.C. supply lines, the alternating voltage must be rectified in a conventional manner and filtered, before it can be supplied to the wires 6 and 7 as a direct voltage $V_b$. In the arrangement shown in FIGURE 1, use is made of an n-p-n-p SCR so that the supply wire 6 is connected to the positive terminal and the supply wire 7 to the negative terminal of the source 5.

If, alternatively, use is made of a p-n-p-n SCR, the symbol of which is shown in FIGURE 1*b*, the polarity of the source 5 and the diode D should be reversed.

The use of an SCR (S) in the deflection circuit described above has the advantage that an additional transformer for stepping-down the mains voltage is eliminated which, apart from economy, has the first advantage that the stray fields associated therewith cannot adversely affect the deflection of the electron beam in the display tube of apparatus including the circuit arrangement of the invention. This is particularly important in the case of television apparatus since, as is known, the electron beam is deflected in a vertical direction at a frequency substantially equal to that of the supply frequency if an alternating voltage supply is used.

If a D.C. voltage supply is available, conductors 6 and 7 may be connected directly thereto, and this constitutes a second advantage. When transistors are used in the apparatus, an interruptor must be employed to convert the direct voltage into alternating voltage, followed by a transformer to step down the alternating voltage so obtained.

A third advantage of the arrangement in accordance with the invention is that the whole apparatus may derive its voltage supply without the use of the additional transformer since the supply voltage $V_0$ for the transistors employed in the said apparatus may also be derived from the deflection circuit. For this purpose the cathode of a rectifier 8 is connected to a tapping 9 on winding 2. It is assumed that, in other parts of the apparatus, transistors are employed as amplifying and switching means to which a negative direct voltage of $V_0$ is used as a supply. The voltage $V_0$, which may be of the order of −12 v., will be obtained between conductor 10 connected to the anode of rectifier 8, and conductor 6, connected to earth which may, for example, be the chassis of the apparatus. The resistor 11 represents the overall load resistance for the rectifier 8 due to the transistors and other current-carrying elements employed in the apparatus. Capacitor 12 functions as the filter capacitor for the rectified output from rectifier 8. Further smoothing elements such as chokes and capacitors may be included if improved filtering is desired.

A particular advantage of obtaining a low voltage D.C. supply source in accordance with the invention resides in the fact that the alternating voltage obtained from tapping 9 has the frequency of the line synchronizing pulses when the deflection circuit is used in a television receiver. If this receiver is adapted, for example, to the European system, the frequency of the alternating voltage obtained from tapping 9 is equal to 15.625 kc./s. Therefore, the smoothing means for the voltage $V_0$ are simpler than in the case in which a rectified alternating voltage of 50 to 60 c./s. has to be smoothed. The additional cost of the rectifier 8 and the said smoothing means is therefore considerably lower than the cost of a transformer for stepping-down the mains voltage, which would be required in a conventional circuit arrangement.

The voltage $V_0$ is obtained in the following manner. A pulsatory voltage 13 is produced across winding 2 as shown in FIGURE 2. The strong positive-going peak is produced during the fly-back period *t* following the sawtooth current through the deflection coil $L_D$ during the conductive period of the SCR (S). During the forward sweep T-*t*, diode D is conducting so that a constant voltage $V_b$ is obtained across winding 2 giving the desired sawtooth current through the deflection coil $L_D$ which is coupled magnetically to winding 2. Since the conductor 6 is grounded, and the anode of diode D is connected to the conductor 7, the line 14 (FIGURE 2) represents ground potential. The tapping point 9 of the winding 2 is so arranged that during the forward sweep T-*t*, the voltage at said point is substantially $V_0$ volts, with negative polarity with respect to the conductor 6, as indicated in FIGURE 2 by the line 15. By connecting the end of the load resistor 11 remote from the anode of the rectifier 8 to the conductor 6, the rectifier 8 conducts during the forward sweep T-*t* and is cut off during the flyback period *t*. This mode of operation has the further advantage that rectifier 8 is conducting for the major part of the period T so that the capacitor 12 can discharge only for the short time *t*, thereby providing a comparatively low internal resistance with consequent good regulation.

If a positive instead of negative voltage $V_0$ is to be derived from conductor 10 with respect to conductor 6, the polarity of the source 5, of the diode D and of the rectifier 8 will be reversed, in which case the SCR (S) will be of the p-n-p-n type.

Instead of the tapping 9, a separate winding may be provided on the transformer 1, one end of which is connected to earth and the other end of which is connected to the rectifier 8. By choosing the appropriate sense of this winding, and by adapting thereto the connection of rectifier 8, either a positive or negative $V_0$ may be produced. Also, in this case, the choice of the earth connection is free in that either the conductor 6 or the conductor 7 may be connected to earth. As a further alternative, if both positive and negative voltages $V_0$ are required, two separate windings may be provided on the transformer 1. These windings are then wound in opposite senses and connected to two rectifiers, one for producing a positive direct voltage $+V_0$ and the other for producing a negative direct voltage $-V_0$.

It is esssential that the SCR (S) should conduct during the flyback period *t* and cut off for the forward sweep T-*t*. Because an SCR cannot be rendered non-conductive by the application of a control-pulse at its base, it is essential to effect a non-conductive state by supplying a pulse of appropriate polarity to the collector *c* of the SCR (S). This is achieved in the present circuit arrangement by providing a quenching coil $L_2$ since at the end of the flyback period the current through the SCR (S) can be gradually taken over by the diode D. This is not possible in known circuit arrangements wherein both the switching element and the diode are open-circuited at the end of the forward sweep, because it is impossible gradually to cut-off the SCR (S) by the application of a voltage pulse between the base and the emitter alone.

It is necessary for the circuit arrangement to be self-starting and the SCR (S) can be cut off by the application of voltage pulses of reverse polarity at its collector *c*. These pulses are derived by means of the action of the quenching coil $L_2$ at the end of the flyback period. The SCR (S) may also be rendered conductive by means of a positive-going pulse at the commencement of the flyback period, said pulse being applied between the base *b* and the emitter *e* in the case of an n-p-n-p type SCR, and by a negative-going pulse between *b* and *e* in the case of a p-n-p-n type SCR.

The circuit arrangements of FIGURES 1 and 4 employ different means for effecting self-starting. In FIGURE 1 the SCR (S) is arranged to self-oscillate, whereas, in FIGURE 4 the SCR (S) is controlled by the deflection circuit. In the latter case the control-oscillator must be fed from the source 5 and not from the voltage $V_0$, since there can be no control-signal until the supply voltage $V_0$ is derived, which does not occur until the SCR (S) is operative. This difficulty is overcome by the use of a second SCR (S') shown in FIGURE 4.

The operation of the self-oscillating SCR circuit shown in FIGURE 1 will be described with reference to FIGURES 2 and 3.

In FIGURE 1, the base *b* of the SCR (S) is connected through an auxiliary winding 16 of transformer 1 and capacitor 17 to the emitter *e*. The junction of the auxiliary winding 16 and capacitor 17 is connected through resistor 18 to the positive terminal of the source 5.

The winding 16 is wound in the same sense as windings 2 and 3 and provides a positive feedback voltage as shown by the curve 13 of FIGURE 2. The frequency-determining element of the self-oscillating SR circuit is partly formed by the time constant of the network 17, 18 since the flyback period *t* plus the quenching period of the SCR (S) are mainly determined by the elements $L_1$, $L_2$, $L_D$, and $C_1$ whereas the forward sweep T-*t* is determined by the time which elapses between the end of the flyback period and the instant of rendering the SCR (S) conducting, which instant is determined by network 17, 18.

At the end of the flyback period *t*, the SCR (S) is cut-off by the reverse E.M.F. developed across coil $L_2$, and is maintained in the cut-off condition by the negative-going voltage derived from the winding 16 and by the voltage on the capacitaor 17. It is assumed that capacitor 17 has a negative charge at the end of the flyback period so that the combined voltage between the base *b* and the emitter *e* of the SCR (S) is determined by the negative voltage across winding 16 and capacitor 17. This is shown in FIGURE 3, in which curve 19 represents the voltage between the base *b* of the SCR (S) and the negative terminal of the source 5, represented by the datum line 20.

During the forward sweep, capacitor 17 is charged positively through the resistor 18 from the source 5 so that its negative charge is eliminated and the positive voltage counteracts the negative voltage across winding 16 until the voltage between the base *b* and the emitter *e* of the SCR (S) is reduced substantially to zero. In the meantime, due to the charging of the capacitor $C_1$ through the charging inductance $L_1$, the voltage at the collector *c* has risen to such a value that with substantially zero volts between the base *b* and the emitter *e* the SCR (S) is rendered conductive. During the conductive period the capacitor $C_1$ is discharged through the collector-emitter circuit and the capacitor 17 through the base-emitter circuit of the SCR (S). At the same time the positive voltage peak across the winding 16 adds to the positive charge of the capacitor 17 which is now negatively charged by the base-emitter current then produced. After the SCR (S) has been cut-off by the action of the quenching coil $L_2$, and after the termination of the flyback, the condition is such that the SCR (S) can be held cut-off until the voltage between its base and emitter has been reduced substantially to zero.

The time-constant of network 17, 18 must be large with respect to the forward period of the sawtooth current. If the voltage $V_b$ supplied by source 5 is of the order of 100 to 200 volts, the voltage across capacitor 17 should not vary by more than 10 volts. This can be achieved by suitably selecting the time-constant of network 17, 18.

If the arrangement shown in FIGURE 1 is included in a television receiver, it is essential that the self-oscillating SCR deflection circuit be synchronized. For this purpose a phase discriminator 21 is provided. Line synchronizing signals 22 plus a comparison signal obtained from an auxiliary winding 23 coupled with the transformer 1 are fed to the phase-discriminator 21. According to the phase difference between the two signals applied to the phase discriminator 21, an output voltage is derived which accelerates or delays the charging of capacitor 17 so that the instant at which the SCR (S) is rendered conductive can be shifted.

In the circuit arrangement of FIGURE 4, a second SCR (S') is arranged to provide control means for SCR (S). It is of identical type but may be constructed to withstand a much lower breakdown voltage than SCR (S). If, for example, the supply voltage $V_b$ is 200 volts, SCR (S) must withstand a voltage of about 600 to 700 volts whereas the control SCR (S') need only withstand about 50 volts.

The SCR (S') has its emitter *e* connected to the positive terminal 6 and its collector *c*, through a quenching coil 24 and a collector resistor 25, to the negative terminal of the source 5. The series combination of a charging capacitor 26, a limiting resistor 27 and a base resistor 28 are connected in parallel with resistor 25. The junction of resistors 27 and 28 is connected to the base *b* of the switching SCR (S).

At the end of the flyback period *t* capacitor 26 is charged so that the electrode connected to resistor 25 is positive with respect to the other electrode. Thus the collector voltage of the SCR (S') is so low that it is quenched and remains quenched for the duration of the prevailing phase voltage. Capacitor 26 can discharge through resistors 25, 27 and 28, so that the base *b* of the SCR (S) becomes negative with respect to the emitter *e* thereof. This voltage in co-operation with the overswing coil $L_2$, is sufficient to cut-off SCR (S). Discharge of capacitor 26 continues until the voltage at the collector *c* of the SCR (S') has risen to an extent such that it conducts. Then capacitor 26 is charged from the source 5 via the SCR (S'), coil 24, resistor 27 and the base-emitter circuit of the switching SCR (S) since, owing to the reversal of the current through capacitor 26, the base-emitter circuit of SR (S) operating as a diode, is rendered conductive. Hence the collector-emitter circuit of the switching SCR (S) is rendered conductive so that capacitor $C_1$ can be discharged.

The charging of capacitor 26 continues until the voltage between the emitter *e* and collector *c* of SCR (S'), in co-operation with quenching coil 24, has fallen to an extent such that said SCR is cut off, whereupon capacitor 26 discharges and restores the situation.

The limiting resistor 27 is provided for the purpose of limiting the charging current through capacitor 26 to prevent excessive base current through SCR (S) which might otherwise be damaged. If there is no risk of damage, resistor 27 may be omitted, in which case the charge time of the capacitor 26 is determined by the quenching coil 24, the internal collector-emitter resistance of the switching SCR (S), the internal base-emitter resistance of said SCR and resistor 28. Since the overall resistance of the charging circuit is low, the quenching coil 24 and capacitor 26 constitute an oscillatory circuit having a fundamental frequency, periodicity of which is less than the flyback period *t* so that capacitor 26 is charged very rapidly and the SCR (S') is therefore rapidly quenched.

The foregoing measures are required for the rapid turn-on of the switching SCR (S) and for subsequent quenching of the control SCR (S'). In the circuit arrangement of FIGURE 4, the flyback period is determined by the elements connected in series with the collector circuit of the switching SCR (S), and the forward sweep is determined mainly by the discharge time of capacitor 26 and resistor 25, the said resistor having a value large compared with resistors 27 and 28. The time-constant of network 25, 26 must be less than the forward sweep period T-*t* since the since the capacitor 26 must be capable of discharging during one forward sweep to an extent such that the turn-on voltage of the SCR (S') is reached within the desired time.

If the arrangement of FIGURE 4 is employed in a television receiver, the base *b* of SCR (S') is connected to the output of the phase discriminator 21. The instant of breakdown of the control SCR (S') is determined by the current through its base *b*, so that the frequency and phase of the generated sawtooth current may be varied as a function of the signals fed to the phase discriminator 21 via conductor 22 and auxiliary winding 23.

When the source 5 is applied the discriminator 21 is not operative and the circuit arrangement is self-starting at its own frequency. As soon as the supply voltage $V_0$ causes the remaining part of the receiver to operate, the discriminator 21 becomes operative and synchronizes the time-base frequency.

If, alternatively a positive voltage $V_0$ with respect to earth is desired in the circuit arrangement of FIGURE 4 the polarity of the source 5, the diode D and the rectifier 8 must be reversed and SCR (S) and SCR (S') exchanged for a n-p-n-p- and p-n-p-n type respectively.

Although a silicon controlled rectifier is used as a switching or controlling element it is within the scope of the invention to employ other semi-conductor devices provided they can withstand the voltage, in the cut-off condition, which is approximately three times the supply voltage $V_b$, since the voltage across the switching element S attains that value. This is because the switching element S is open-circuited during the forward period T-*t* and is conductive during the flyback period *t*. During the flyback period the voltage across S is substantially equal to zero, and for the forward sweep it is the stepped-up voltage across the circuit included in the output circuit of S. Since the forward sweep period T-*t* is about five greater than the flyback period *t* the said stepped-up voltage will be much less than that of the conventional arrangements in which the circuit element is cut-off during the flyback period and is conducting during the forward sweep period. In conventional deflection circuits the differential factor *di/dt*, which determines the magnitude of this stepped-up voltage, is much greater than in a deflection circuit used in accordane with the invention. In the conventional deflection circuit which normally uses an electron tube as the switching means the voltage across said tube in the cut-off state is about nine times greater than the supply voltage. It follows that, with the same supply voltage $V_b$, the use of a time-base circuit arrangement of the type set forth for the purpose of obtaining a low D.C. supply voltage is much more convenient than the conventional deflection circuit employing electron tubes as the switching means.

What is claimed is:

1. In a television receiver incorporating semiconductor elements as the active elements, a circuit for producing in an inductance a sawtooth current having a sweep period and a flyback period and further comprising means for producing a relatively low direct current voltage for said semiconductor elements, comprising a transformer having first and second inductively coupled windings, a capacitor, an inductive impedance, a source of direct current voltage, means serially connecting said inductive impedance and capacitor to said voltage source thereby to charge said capacitor, a relaxation oscillator comprising a semiconductor switch having a control electrode, means serially connecting said semiconductor switch with said first winding and said capacitor to selectively discharge said capacitor through said first winding and said switch during said flyback period, said relaxation oscillator further comprising a resistance-capacitance timing circuit connected to said voltage source and to said semiconductor control electrode for periodically initiating conduction therein, means coupling said inductance to said second winding, an energy recovery circuit for maintaining the potential across said second winding at a substantally constant value during the said sweep period thereby to establish a linearly varying current flow through said inductance, said energy recovery circuit comprising a diode connected in series with said second winding across said voltage source and polarized in the reverse direction with respect to said voltage source, rectifier means coupled to said second winding and poled with respect to the potential across said second winding for deriving from said second winding said low direct current voltage during the said sweep period, and and output terminal connected to said rectifier means for supplying said low direct current voltage to said semiconductor active elements.

2. Apparatus for producing a sawtooth current having a sweep period and a flyback period and further comprising means for producing a relatively low direct current voltage, comprising inductance means having first and second inductively coupled windings, a source of voltage, a capacitor, impedance means, means serially connecting said impedance and said capacitor to said voltage source thereby to charge said capacitor, means for energizing said inductance means during said flyback period comprising means periodically connecting said first winding in parallel with said capacitor during said flyback period, means coupled to said second winding for maintaining the potential across said second winding at a substantially constant valve during said sweep period thereby to establish a linearly varying current flow through said second winding, rectifier means coupled to said second winding and poled with respect to the potential across said second winding for deriving therefrom said low direct current voltage during said sweep period, and a self-starting timing circuit connected to said voltage source and comprising an energy storage element which stores energy from said source and periodically discharges its stored energy thereby cyclically actuating said inductance energizing means.

3. Apparatus as described in claim 2 wherein said inductance energizing means comprises a semiconductor amplifying device having a control electrode connected to said timing circuit and a pair of electrodes defining a current path through said semiconductor device, means connecting ot least one of said pair of electrodes to said first winding, a feedback winding coupled to said inductance means and to said control electrode for supplying a positive feedback voltage to said control electrode thereby to control conduction in said semiconductor current path and said first winding.

4. A deflection circuit for producing a sawtooth current in an inductance having a sweep period and a flyback period and including means for deriving a relatively low direct current voltage, said circuit comprising winding means having first and second inductively coupled portions, means for coupling said inductance to said winding means, electronic switch means having a current path and a control electrode for altering conduction therein, means for coupling said switch current path to said first portion of said winding means, a source of operating voltage coupled to said winding means, a control circuit coupled to said control electrode for periodically rendering said switch means conductive during said flyback period whereby current flows in said first portion of said winding means, a rectifier element connected across said second portion of said winding means, and having an output terminal for supplying a direct current voltage which is lower than said operating voltage, said control circuit further comprising a resistance-capacitance network having a time constant which is substantially greater than said sweep period, and means for coupling said network to said control electrode so as to vary the voltage applied thereto thereby rendering said apparatus self-starting.

5. Apparatus for producing a sawtooth current in an inductance having a sweep period and a flyback period and further comprising means for deriving a relatively low direct current voltage, said apparatus comprising winding means having first and second inductively coupled portions, means for coupling said inductance to said winding means, electronic switch means having a current path and a control electrode for altering conduction therein, means for coupling said switch current path to said first portion of said winding means, a source of operating voltage coupled to said winding means, a control circuit coupled to said control electrode for periodically rendering said switch means conductive during said flyback period whereby current flows in said first portion of said winding means, a rectifier element connected across said second portion of said winding means and having an output terminal for supplying a direct current voltage which is lower than said operating voltage, a diode connected to said winding means and polarized so as to conduct during the sweep period of said sawtooth current, said winding means further comprising a feedback winding coupled to said control circuit so as to vary the voltage applied to said control electrode for rendering said apparatus self-starting.

6. Apparatus as described in claim 5 wherein said self-starting means further comprises a capacitor coupled to said operating voltage source and to said control electrode whereby said capacitor is charged from said voltage source and the combined effect of the electrical charge on said capacitor and the voltage induced in said fed back winding control the periodic conduction of said electronic switch means to provide a free-running circuit.

7. Apparatus for deriving a direct current voltage from a sawtooth current sweep circuit having a sweep period and a flyback period, comprising winding means for deriving said sawtooth current, electronic switch means comprising a first silicon-controlled rectifier of a given conductivity type having an emitter and collector which define a current path and a control electrode for altering the conduction therein, means for connecting said current path in series with a portion of said winding means, a control circuit for periodically rendering said switch means conductive during said flyback periods comprising a second silicon-controlled rectifier of opposite conductivity type and having an emitter, a collector and a control electrode, a source of operating voltage coupled to said winding means and to said first and second silicon-controlled rectifiers, circuit means interconnecting the emitter-collector path of said second silicon-controlled rectifier with the control electrode of said first silicon-controlled rectifier and including a capacitor in series therewith, said capacitor being charged from said voltage source via said emitter-collector path of said second silicon-controlled rectifier, said circuit means further comprising a discharge path for said capacitor including the emitter and control electrode circuit of said first silicon-controlled rectifier, said circuit means rendering said first and second silicon-controlled rectifier's alternately conductive and non-conductive, and a rectifier circuit connected across a portion of said winding means and comprising a diode element, filter means and an output terminal for supplying said D.C. voltage to a load circuit.

8. A deflection circuit for producing a sawtooth current in a deflection coil and a direct current voltage, said sawtooth current having a sweep period and a flyback period, said circuit comprising a transformer having winding means, means for coupling said deflection coil to said winding means, a source of operating voltage which is higher than said direct current voltage, a first capacitor, an impedance element, means connecting said capacitor and said impedance element in series circuit across said voltage source, electronic switch means having a current path and a control electrode for altering conduction therein, means for coupling said switch current path in series with said capacitor and a first portion of said winding means, means for coupling said source of operating voltage to said winding means said switch means, a control circuit including a second capacitor which is coupled to said voltage source and to said control electrode for periodically rendering said switch means conductive so as to discharge said first capacitor during said flyback periods whereby current flows in said first portion of said winding means, a rectifier element connected across a second portion of said winding means and having an output terminal for supplying said direct current voltage to a load, said rectifier element being polarized so as to conduct during said sweep period.

9. A deflection circuit for producing a sawtooth current in a deflection coil and a direct current voltage, said sawcurrent having a sweep period and a flyback period, said circuit comprising a transformer having winding means, means for coupling said deflection coil to said winding means, electronic switch means having a current path and a control electrode for altering conduction therein, means for coupling said switch current path in series with a first portion of said winding means, a source of operating voltage which is higher than said direct current voltage, means coupling said voltage source to said winding means and said switch means, a control circuit including a capacitor which is coupled to said voltage source and to said control electrode for periodically rendering said switch means conductive during said flyback periods whereby current flows in said first portion of said winding means, a rectifier element connected to a second portion of said winding means and having an output terminal for supplying said direct current voltage to a load, said rectifier element being polarized so as to conduct during said sweep period, and means for maintaining a constant voltage across said second portion of said winding means during said sweep period comprising a diode serially connected with said second portion of said winding means across said voltage source and polarized to conduct during said sweep period.

10. A deflection circuit for producing a sawtooth current in a deflection coil and a direct current voltage, said sawtooth current having a sweep period and a flyback period, said circuit comprising a transformer having winding means, means for coupling said deflection coil to said winding means, electronic switch means having a current path and a control electrode for altering conduction therein, means for coupling said switch current path in series with a first portion of said winding means, a source of operating voltage which is higher than said direct current voltage, means coupling said voltage source to said winding means and said switch means, a control circuit including a capacitor which is coupled to said voltage source and to said control electrode for periodically rendering said switch means conductive during said flyback periods whereby current flows in said first portion of said winding means, a rectifier element connected across a second portion of said winding means and having an output terminal for supplying said direct current voltage to a load, said rectifier element being polarized so as to conduct during said sweep period, means for maintaining a constant voltage across said second portion of said winding means during said sweep period, said transformer further comprising a feedback winding inductively coupled to said winding means and having voltage pulses induced therein, and means for coupling said feedback winding to said control electrode whereby the combined effect of the electrical charge on said capacitor and the voltage induced in said feedback winding control the periodic conduction of said electronic switch means to provide a free-running circuit.

11. A deflection circuit for producing a sawtooth current in a deflection coil and a direct current voltage, said sawtooth current having a sweep period and a flyback period, said circuit comprising a transformer having first and second inductively coupled windings, a first inductance element and a capacitor, a source of direct current voltage derived directly from a source of line voltage, electronic switch means comprising a semiconductor element having a current path and a control electrode for controlling conduction therein, means connecting said first and second windings, said first inductance element and said capacitor in series across said direct current voltage source, a control circuit comprising an RC timing circuit connected to said DC voltage source, means for coupling said control electrode to said RC timing circuit whereby said semiconductor element is periodically rendered conductive during said flyback periods, a second inductance element, means connecting said second inductance element, said capacitor, said second winding and said switch means current path in a closed series circuit thereby to provide a discharge path for said capacitor through said semiconductor current path during said flyback period, a diode coupled to said first winding and to said direct current voltage source, means comprising said second inductance element for cutting off said semiconductor element thereby rendering said diode conductive and initiating said sweep period, said diode being polarized in the reverse direction with respect to said direct current voltage source, a rectifier element connected across a portion of said first winding and having an output terminal for supplying said direct current voltage to a load, said rectifier element being polarized so as to conduct during said sweep period.

References Cited by the Examiner

UNITED STATES PATENTS

| | | | |
|---|---|---|---|
| 2,920,259 | 1/1960 | Light. | |
| 2,995,679 | 8/1961 | Skoyles | 315—27 X |

OTHER REFERENCES

IRE Dictionary of Electronics Terms and Symbols, Institute of Radio Engineers. New York, 1961, p. 122.

DAVID G. REDINBAUGH, *Primary Examiner.*

ARTHUR GAUSS, *Examiner.*

UNITED STATES PATENT OFFICE

CERTIFICATE OF CORRECTION

Patent No. 3,235,766 February 15, 1966

Kenneth Edward Martin et al.

It is hereby certified that error appears in the above numbered patent requiring correction and that the said Letters Patent should read as corrected below.

Column 3, line 60, for "the", second occurrence, read -- an --; column 5, line 41, for "SR" read -- SCR --; line 54, for "capacitaor" read -- capacitor --; column 6, line 61, for "SR" read -- SCR --; column 7, line 6, before "periodicity" insert -- the --; line 19, strike out "since the"; column 8, line 28, for "and", second occurrence, read -- an --; line 60, for "ot" read -- at --; column 10, line 17, after "means", first occurrence, insert -- and --; line 29, for "saw-" read -- sawtooth --.

Signed and sealed this 23rd day of May 1967.

(SEAL)

Attest:

EDWARD M. FLETCHER, JR.
Attesting Officer

EDWARD J. BRENNER
Commissioner of Patents